United States Patent
Lee

(10) Patent No.: US 8,407,698 B2
(45) Date of Patent: Mar. 26, 2013

(54) DRIVER INSTALLATION AND DISKLESS BOOTING OF VIRTUAL AND PHYSICAL MACHINES BASED ON MACHINE CHARACTERISTIC

(75) Inventor: Moso Lee, Nashua, NH (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 1099 days.

(21) Appl. No.: 12/359,122

(22) Filed: Jan. 23, 2009

(65) Prior Publication Data

US 2009/0193413 A1    Jul. 30, 2009

Related U.S. Application Data

(60) Provisional application No. 61/023,708, filed on Jan. 25, 2008.

(51) Int. Cl.
*G06F 9/455* (2006.01)
*G06F 15/177* (2006.01)

(52) U.S. Cl. .................. 718/1; 713/2; 709/220; 709/222

(58) Field of Classification Search .......................... None
See application file for complete search history.

(56) References Cited

U.S. PATENT DOCUMENTS

| | | | | |
|---|---|---|---|---|
| 6,691,160 B1 * | 2/2004 | Bradley | ........................ | 709/222 |
| 7,392,318 B1 * | 6/2008 | Rai | ................................ | 709/230 |
| 8,166,474 B1 * | 4/2012 | Delco et al. | ........................ | 718/1 |
| 2004/0002877 A1 * | 1/2004 | Angelo et al. | ..................... | 705/7 |
| 2004/0186864 A1 * | 9/2004 | Hsu et al. | ........................ | 708/100 |
| 2004/0221298 A1 * | 11/2004 | Cedola | ........................... | 719/321 |
| 2005/0198629 A1 * | 9/2005 | Vishwanath | ................... | 717/174 |
| 2005/0238046 A1 * | 10/2005 | Hassan et al. | ................... | 370/465 |
| 2005/0249235 A1 * | 11/2005 | Lee | ................................ | 370/463 |
| 2006/0031547 A1 * | 2/2006 | Tsui et al. | ........................ | 709/231 |
| 2008/0025297 A1 * | 1/2008 | Kashyap | ........................ | 370/389 |
| 2008/0028052 A1 * | 1/2008 | Currid et al. | ................... | 709/222 |
| 2008/0046548 A1 * | 2/2008 | Doran et al. | ................... | 709/222 |
| 2008/0046708 A1 * | 2/2008 | Fitzgerald et al. | ................. | 713/2 |
| 2009/0077551 A1 * | 3/2009 | Whiteley | .......................... | 718/1 |

OTHER PUBLICATIONS

VMware White Paper, Understanding Full Virtualization, Paravirtualization, and Hardware Assist.*
Network booting—Wikipedia (2007).*

* cited by examiner

*Primary Examiner* — Meng An
*Assistant Examiner* — Benjamin Wu
(74) *Attorney, Agent, or Firm* — Foley and Lardner LLP; John D. Lanza

(57) ABSTRACT

Methods and systems are described for provisioning a common virtual disk to both a physical and a virtual computing machine. These methods and systems can include creating a virtual disk that has binding information for both a paravirtual network interface card and a physical network interface card so that, either a virtual machine having a paravirtual network interface card, or a physical machine having a physical network interface card, may boot from the created virtual disk. Creation of the virtual disk can include exposing the paravirtual network interface card to a physical machine so that an installer program may bind to both the paravirtual network interface card and the physical network interface card.

18 Claims, 7 Drawing Sheets

DRIVER INSTALLATION AND DISKLESS BOOTING OF VIRTUAL AND PHYSICAL MACHINES BASED ON MACHINE CHARACTERISTIC

This U.S. Patent Application claims priority to U.S. Provisional Patent Application Ser. No. 61/023,708, filed on Jan. 25, 2008. The disclosure of this prior application is considered part of the disclosure of this application and is incorporated herein by reference in its entirety.

FIELD OF THE INVENTION

This application relates generally to booting from a resource. More specifically, the application relates to booting from a virtual disk that permits booting from either a physical machine or a virtual machine.

BACKGROUND OF THE INVENTION

Booting a physical or virtual machine from a virtual disk typically requires a virtual disk configured to boot from a particular machine. Thus, when one boots a physical machine from a virtual disk, that virtual disk is typically configured to boot only physical machines. Similarly, when booting a virtual machine from a virtual disk, that virtual disk is typically configured to boot only virtual machines. The distributed computing environments that exist today are heterogeneous in that they typically include both physical and virtual machines. Having to have two sets of virtual disks, where one set is configured to boot physical machines and the other set is configured to boot virtual machines, is cumbersome. Thus, there exists a need for virtual disks that can boot either physical or virtual machines.

An additional need exists for a creation process that permits the creation of a dual-boot virtual disk in either a physical or virtual computing environment. Currently, virtual disks able to boot physical machines are created in physical machine environments. Similarly, virtual disks able to boot virtual machines are created in virtual machine environments. This creation process is inefficient and cumbersome. A need therefore exists for a method or system for creating a virtual disk able to boot either a physical or virtual machine that can execute in either a physical or virtual computing environment.

SUMMARY OF THE INVENTION

In its broadest interpretation, this disclosure describes systems and methods for creating a virtual disk from which a physical machine and/or virtual machine can boot, and systems and methods for booting from such a virtual disk. Virtual disks are sometimes designed and created so that they are dedicated to booting either a physical or virtual machine. Thus, in distributed computing systems that include both physical and virtual computing machines, there are often multiple versions of a virtual disk. Those versions typically differ in that one version is dedicated to booting physical computing machines, while other versions are dedicated to booting virtual computing machines. Providing a single virtual disk from which either a physical or virtual computing machine can boot reduces: the need for different versions of a particular virtual disk; the complexity of booting from a virtual disk in a distributed computing system; and the amount of information stored within a distributed computing environment.

In one aspect, an embodiment of a method for creating a virtual disk is shown and described. The method includes identifying a first value associated with a paravirtual network interface card on a computing machine, and identifying a second value associated with a physical network interface card on the computing machine. The computing machine is bound to the paravirtual network interface card using the first value associated with the paravirtual network interface card thereby generating a first set of binding information representative of a communicative link between the computing machine and the paravirtual network interface card. The computing machine is also bound to the physical network interface card using the second value associated with the physical network interface card thereby generating a second set of binding information representative of a communicative link between the computing machine and the physical network interface card. A virtual disk is then created using the first set of binding information and the second set of binding information.

In one embodiment, the paravirtual network interface card is determined to be inactive. In another embodiment, the paravirtual network interface card is bound to the computing machine responsive to this determination.

In some embodiments, the first value, associated with the paravirtual network interface card, is different from the second value, associated with the physical network interface card.

In one embodiment, the virtual disk that is created is a disk image, while in other embodiments the disk image is a multi-client disk image. Still other embodiments include a computing machine that is a physical computing machine.

Further embodiments include: identifying the first value by scanning a hardware identifier associated with the paravirtual network interface card; and/or identifying the second value by scanning a hardware identifier associated with the physical network interface card.

In another aspect, an embodiment of a method for booting a computing machine from a virtual disk is shown and described. The method includes determining a characteristic of the computing machine, the characteristic identifying the computing machine as one of either of a virtual computing machine and a physical computing machine. Once the characteristic is determined, a network interface card is selected, based in part on the characteristic, from a group consisting of a physical network interface card and a paravirtual network interface card. A driver associated with the selected network interface card is loaded from the virtual disk to the computing machine, and a connection between the computing machine and the virtual disk is established using the loaded driver. The computing machine is then booted from the virtual disk via the established connection.

In some embodiments, the physical network interface card is selected based in part on a determination that the computing machine is a physical computing machine. In other embodiments, the paravirtual network interface card is selected based in part on the determination that the computing machine is a virtual computing machine.

In some embodiments, a driver is loaded from a virtual disk stored on a second computing machine. Other embodiments include a computing machine and a second computing machine resident on the same network.

In another aspect, an embodiment of a system for creating a virtual disk is shown and described. The system includes a computing machine, a paravirtual network interface card that resides on the computing machine and that has an associated first value, and a physical network interface card that resides on the computing machine and that has an associated second value. The system further includes an installer that executes on the computing machine to: identify the associated first value and the associated second value; bind the paravirtual network interface card to the computing machine using the associated first value, and create a first set of binding information representative of the communicative link between the computing machine and the paravirtual network interface card; bind the physical network interface card to the computing machine using the associated second value, and create a second set of binding information representative of the communicative link between the computing machine and the physical network interface card; and create a virtual disk that includes the first set of binding information and the second set of binding information.

In some embodiments, the system includes an installer program that further determines whether the paravirtual network interface card is inactive. The installer program, in other embodiments, binds the paravirtual network interface card to the computing machine, responsive to determining that the paravirtual network interface card is inactive.

In some embodiments, the first value, associated with the paravirtual network interface card, is different from the second value, associated with the physical network interface card.

In further embodiments, the installer program identifies the associated first value by scanning a hardware identifier; and/or identifies the associated second value by scanning a hardware identifier.

Still other embodiments include a virtual disk stored on a computing machine located in a location remote from the location of the computing machine, while in other embodiments the virtual disk is stored on the computing machine.

Other embodiments include a system that further comprises a boot manager executing on a second computing machine that has an associated characteristic that identifies the second computing machine as one of either a virtual computing machine or a physical computing machine. This boot manager executes to do each of the following: determine the associated characteristic; select, responsive to identification of the associated characteristic, a network interface card from a group consisting of a physical network interface card and a paravirtual network interface card; load a driver associated with the selected network interface card to the second computing machine from the virtual disk; establish a connection between the second computing machine and the virtual disk using the loaded driver; and boot the second computing machine from the virtual disk via the connection. This system in some embodiments may include a boot manager that selects the physical network interface card when the second computing machine is a physical computing machine, and/or selects the paravirtual network interface card when the second computing machine is a virtual computing machine.

BRIEF DESCRIPTION OF THE DRAWINGS

The following figures depict certain illustrative embodiments of a method and system for booting physical and virtual machines from a common virtual disk, where like reference numerals refer to like elements. Each depicted embodiment is illustrative of the method and system and not limiting.

DETAILED DESCRIPTION

Figure 1A:
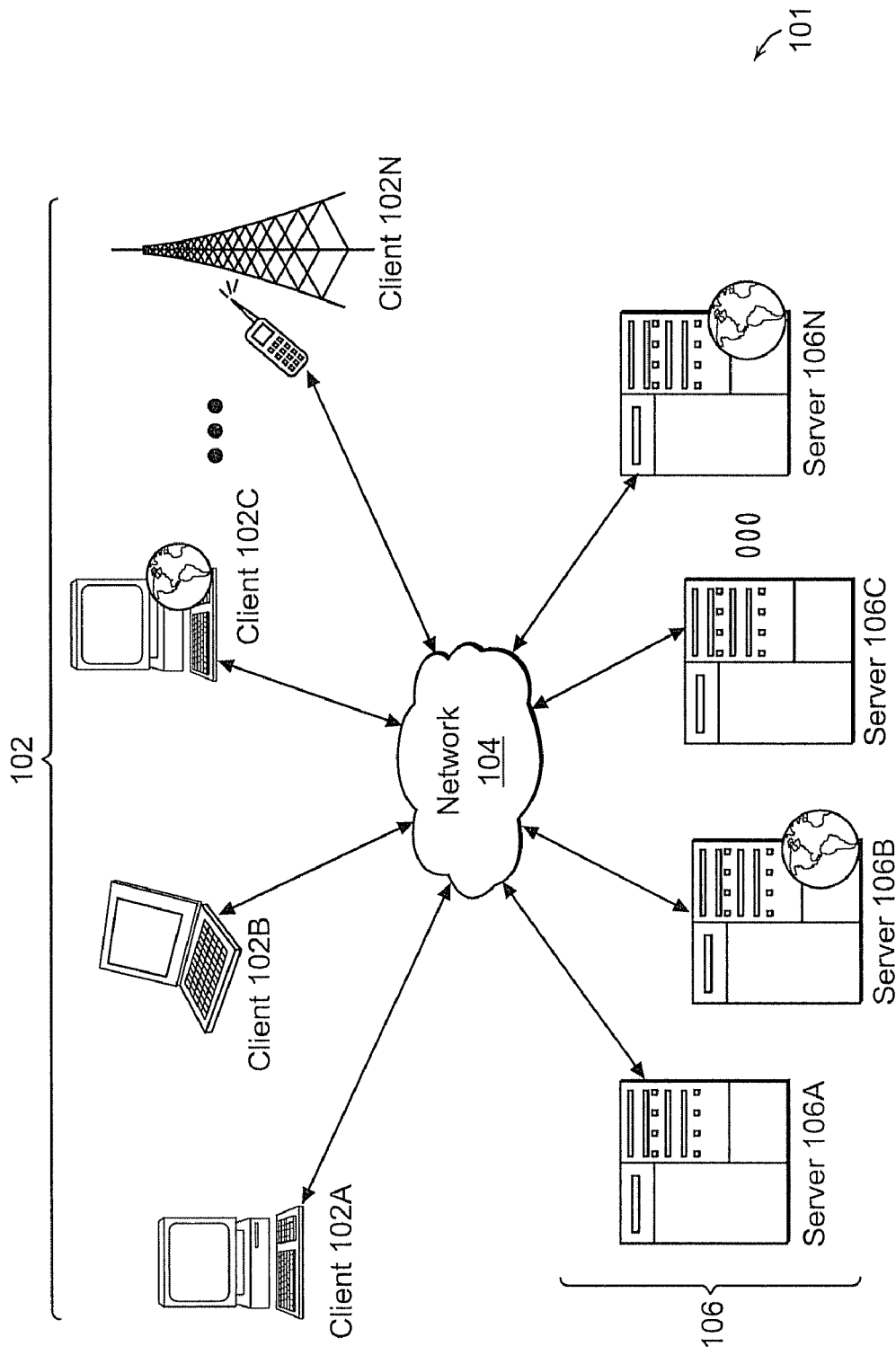
FIG. 1A is a block diagram illustrative of an embodiment of a remote-access, networked environment with a client machine that communicates with a server.

FIG. 1A illustrates one embodiment of a computing environment 101 that includes one or more client machines 102A-102N in communication with servers 106A-106N, and a network 104 installed in between the client machines 102A-102N and the servers 106A-106N. In some embodiments, client machines 102A-10N may be referred to as a single client machine 102 or a single group of client machines 102, while servers may be referred to as a single server 106 or a single group of servers 106. One embodiment includes a single client machine 102 communicating with more than one server 106, another embodiment includes a single server 106 communicating with more than one client machine 102, while another embodiment includes a single client machine 102 communicating with a single server 106.

A client machine 102 within the computing environment may in some embodiments, be referenced by any one of the following terms: client machine(s) 102; client(s); client computer(s); client device(s); client computing device(s); client node(s); endpoint(s); endpoint node(s); or a second machine. The server 106 in some embodiments may be referenced by any one of the following terms: server(s), server farm(s), host computing device(s), or a first machine(s).

The client machine 102 can in some embodiments execute, operate or otherwise provide an application that can be any one of the following: software; a program; executable instructions; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other type and/or form of executable instructions capable of executing on client machine 102. Still other embodiments may include a computing environment 101 with an application that is any of either server-based or remote-based, and an application that is executed on the server 106 on behalf of the client machine 102. Further embodiments of the computing environment 101 include a server 106 configured to display output graphical data to a client machine 102 using a thin-client or remote-display protocol, where the protocol used can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

In one embodiment, the client machine 102 can be a virtual machine 102C such as those manufactured by XenSolutions, Citrix Systems, IBM, VMware, or any other virtual machine able to implement the methods and systems described herein.

The computing environment 101 can, in some embodiments, include more than one server 106A-106N where the servers 106A-106N are: grouped together as a single server 106 entity, logically-grouped together in a server farm 106; geographically dispersed and logically grouped together in a server farm 106, located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity or in other embodiments may include multiple server farms 106. The computing environment 101 can include more than one server 106A-106N grouped together in a single server farm 106 where the server farm 106 is heterogeneous such that one server 106A-106N is configured to operate according to a first type of operating system platform (e.g., WINDOWS NT, manufactured by Microsoft Corp. of Redmond, Wash.), while one or more other servers 106A-106N are configured to operate according to a second type of operating system platform (e.g., Unix or Linux); more than one server 106A-106N is configured to operate according to a first type of operating system platform (e.g., WINDOWS NT), while another server 106A-106N is configured to operate according to a second type of operating system platform (e.g., Unix or Linux); or more than one server 106A-106N is configured to operate according to a first type of operating system platform (e.g., WINDOWS NT) while more than one of the other servers 106A-106N are configured to operate according to a second type of operating system platform (e.g., Unix or Linux).

The computing environment 101 can in some embodiments include a server 106 or more than one server 106 configured to provide the functionality of any one of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 configured to operate as an active direction; a server 106 configured to operate as application acceleration application that provides firewall functionality, application functionality, or load balancing functionality, or other type of computing machine configured to operate as a server 106. In some embodiments, a server 106 may include a remote authentication dial-in user service such that the server 106 is a RADIUS server. Embodiments of the computing environment 101 where the server 106 comprises an appliance, the server 106 can be an appliance manufactured by any one of the following manufacturers: the Citrix Application Networking Group; Silver Peak Systems, Inc; Riverbed Technology, Inc.; F5 Networks, Inc.; or Juniper Networks, Inc. Some embodiments include a server 106 with the following functionality: a first server 106A that receives requests from a client machine 102, forwards the request to a second server 106B, and responds to the request generated by the client machine with a response from the second server 106B; acquires an enumeration of applications available to the client machines 102 and address information associated with a server 106 hosting an application identified by the enumeration of applications; presents responses to client requests using a web interface; communicates directly with the client 102 to provide the client 102 with access to an identified application; receives output data, such as display data, generated by an execution of an identified application on the server 106.

The server 106 can be configured to execute any one of the following applications: an application providing a thin-client computing or a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 configured to execute an application so that the server may function as an application server such as any one of the following application server types: an email server that provides email services such as MICROSOFT EXCHANGE manufactured by the Microsoft Corporation; a web or Internet server; a desktop sharing server; or a collaboration server. Still other embodiments include a server 106 that executes an application that is any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

In one embodiment, the server 106 may be a virtual machine 106B such as those manufactured by XenSolutions, Citrix Systems, IBM, VMware, or any other virtual machine able to implement the methods and systems described herein.

Client machines 102 may function, in some embodiments, as a client node seeking access to resources provided by a server 106, or as a server 106 providing other clients 102A-102N with access to hosted resources. One embodiment of the computing environment 101 includes a server 106 that provides the functionality of a master node. Communication between the client machine 102 and either a server 106 or servers 106A-106N can be established via any of the following methods: direct communication between a client machine 102 and a server 106A-106N in a server farm 106; a client machine 102 that uses a program neighborhood application to communicate with a server 106a-106n in a server farm 106; or a client machine 102 that uses a network 104 to communicate with a server 106A-106N in a server farm 106. One embodiment of the computing environment 101 includes a client machine 102 that uses a network 104 to request that applications hosted by a server 106A-106N in a server farm 106 execute, and uses the network 104 to receive from the server 106A-106N graphical display output representative of the application execution. In other embodiments, a master node provides the functionality required to identify and provide address information associated with a server 106 hosting a requested application. Still other embodiments include a master node that can be any one of the following: a server 106A-106N within the server farm 106; a remote computing machine connected to the server farm 106 but not included within the server farm 106; a remote computing machine connected to a client 102 but not included within a group of client machines 102; or a client machine 102.

The network 104 between the client machine 102 and the server 106 is a connection over which data is transferred between the client machine 102 and the server 106. Although the illustration in FIG. 1A depicts a network 104 connecting the client machines 102 to the servers 106, other embodiments include a computing environment 101 with client machines 102 installed on the same network as the servers 106. Other embodiments can include a computing environment 101 with a network 104 that can be any of the following: a local-area network (LAN); a metropolitan area network (MAN); a wide area network (WAN); a primary network 104 comprised of multiple sub-networks 104' located between the client machines 102 and the servers 106; a primary public network 104 with a private sub-network 104'; a primary private network 104 with a public sub-network 104'; or a primary private network 104 with a private sub-network 104'. Still further embodiments include a network 104 that can be any of the following network types: a point to point network;

a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; a network 104 that includes a wireless link where the wireless link can be an infrared channel or satellite band; or any other network type able to transfer data from client machines 102 to servers 106 and vice versa to accomplish the methods and systems described herein. Network topology may differ within different embodiments, possible network topologies include: a bus network topology; a star network topology; a ring network topology; a repeater-based network topology; a tiered-star network topology; or any other network topology able transfer data from client machines 102 to servers 106, and vice versa, to accomplish the methods and systems described herein. Additional embodiments may include a network 104 of mobile telephone networks that use a protocol to communicate among mobile devices, where the protocol can be any one of the following: AMPS; TDMA; CDMA; GSM; GPRS UMTS; or any other protocol able to transmit data among mobile devices to accomplish the systems and methods described herein.

Figure 1B:
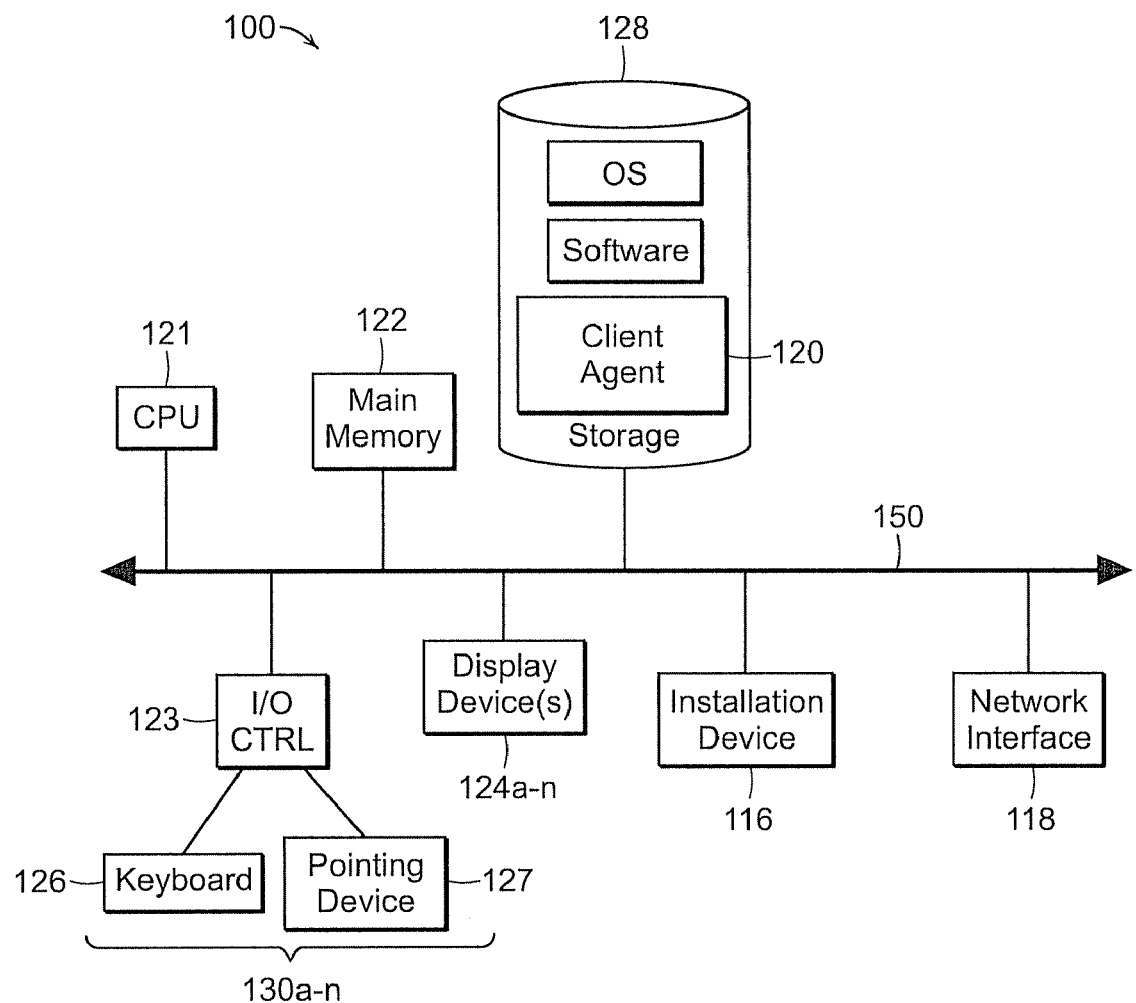
FIGS. 1B and 1C are block diagrams illustrative of an embodiment of computing machines for practicing the methods and systems described herein.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

Figure 1C:
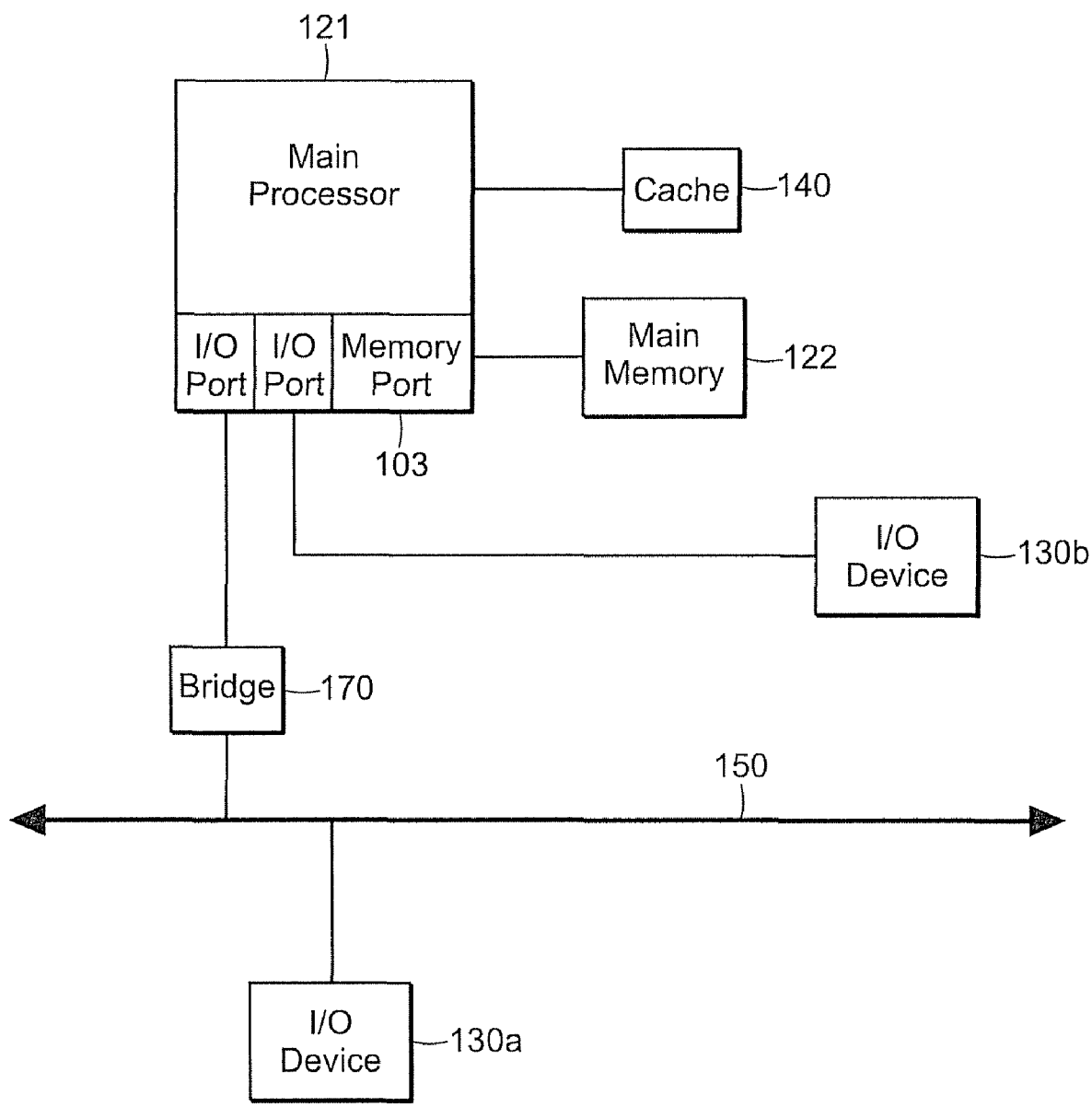

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits capable of executing the systems and methods described herein. Still other embodiments of the central processing unit 122 may include any combination of the following: a microprocessor, a microcontroller, a central processing unit with a single processing core, a central processing unit with two processing cores, or a central processing unit with more than one processing cores.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O devices 130A-130N. In some embodiments, the local system bus 150 can be any one of the following types of buses: a VESA VL bus; an ISA bus; an EISA bus; a Micro-Channel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121 via an Advanced Graphics Port (AGP). Still other versions of the computing machine 100 include a processor 121 connected to an I/O device 130A-130N via any one of the following connections: HyperTransport, Rapid I/O, or InfiniBand. Further embodiments of the computing machine 100 include a communication connection where the processor 121 communicates with one I/O device 130A using a local interconnect bus and with a second I/O device 130B using a direct connection.

Included within some embodiments of the computing device 100 is each of a main memory unit 122 and cache memory 140. The cache memory 140 will in some embodiments be any one of the following types of memory: SRAM; BSRAM; or EDRAM. Other embodiments include cache memory 140 and a main memory unit 122 that can be any one of the following types of memory: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), or any other type of memory device capable of executing the systems and methods described herein. The main memory unit 122 and/or the cache memory 140 can in some embodiments include one or more memory devices capable of storing data and allowing any storage location to be directly accessed by the central processing unit 121. Further embodiments include a central processing unit 121 that can access the main memory 122 via one of either: a system bus 150; a memory port 103; or any other connection, bus or port that allows the processor 121 to access memory 122.

One embodiment of the computing device 100 provides support for any one of the following installation devices 116: a floppy disk drive for receiving floppy disks such as 3.5-inch, 5.25-inch disks or ZIP disks, a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments of an I/O device 130 may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a Fibre-Channel bus; or a Serial Attached small computer system interface bus.

In some embodiments, the computing machine 100 can connect to multiple display devices 124A-124N, in other embodiments the computing device 100 can connect to a single display device 124, while in still other embodiments the computing device 100 connects to display devices 124A-124N that are the same type or form of display, or to display devices that are different types or forms. Embodiments of the display devices 124A-124N can be supported and enabled by the following: one or multiple I/O devices 130A-130N; the I/O controller 123; a combination of I/O device(s) 130A-130N and the I/O controller 123; any combination of hardware and software able to support a display device 124A-124N; any type and/or form of video adapter, video card, driver, and/or library to interface, communicate, connect or otherwise use the display devices 124a-124n. The computing device 100 may in some embodiments be configured to use one or multiple display devices 124A-124N, these configurations include: having multiple connectors to interface to multiple display devices 124a-124n; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and executing software on the main computing device 100 and multiple secondary computing devices to enable the main computing device 100 to use a secondary computing device's display as a display device 124A-124N for the main computing device 100. Still other embodiments of the computing device 100 may include multiple display devices 124A-124N provided by multiple secondary computing devices and connected to the main computing device 100 via a network.

In some embodiments of the computing machine 100, an operating system may be included to control task scheduling and access to system resources. Embodiments of the computing device 100 can run any one of the following operation systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; WINDOWS VISTA; and WINDOWS 7; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system capable of running on the computing device and performing the operations described herein. One embodiment of the computing machine 100 has multiple operating systems installed thereon.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95cl, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. Still other embodiments of the computing environment 101 include a mobile computing device 100 that can be any one of the following: any one series of Blackberry, or other handheld device manufactured by Research In Motion Limited; the iPhone manufactured by Apple Computer; any handheld or smart phone; a Pocket PC; a Pocket PC Phone; or any other handheld mobile device supporting Microsoft Windows Mobile Software.

Figure 2:
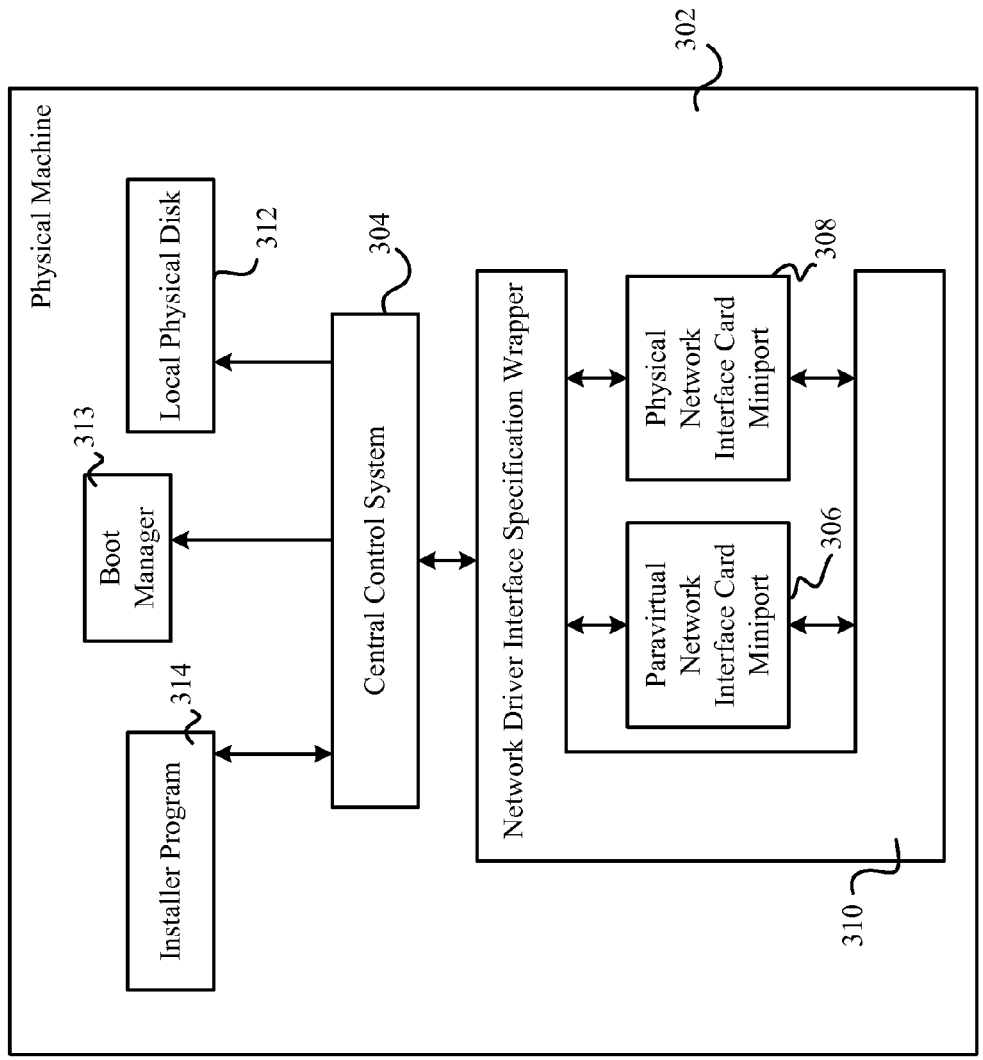
FIG. 2 is a block diagram illustrative of an embodiment of a physical machine.

Illustrated in FIG. 2 is block diagram that illustrates an embodiment of a physical machine 302 environment configured to create a virtual disk from which both a virtual machine and physical machine may boot. Included within the physical machine 302 is a central control system 304 in communication with a local physical disk 312, a boot manager 313, an installer program 314, a paravirtual network interface card (NIC) miniport 306, a physical network interface card (NIC) miniport 308 and a network driver interface specification (NDIS) wrapper 310. Both the paravirtual NIC miniport 306 and the physical NIC miniport 308 are in communication with the NDIS wrapper 310.

Further referring to FIG. 2, and in more detail, the physical machine 302 is a computing machine having the ability to perform logic or functions in accordance with programmed instructions. In some embodiments, the physical machine 302 may be a computing workstation, a desktop computer, a laptop or notebook computer, a server, or any of the other embodiments of the computing machine 100 listed above. Still further embodiments include a physical machine 302 that is referred to by any of the following identifying labels: computing machine; computer; local computing machine; remote computing machine; first computing machine; second computing machine; third computing machine; machine; or any other identifier used to denote some type of system having a processor and a memory element, wherein the processor is able to execute software commands. The physical machine 302 may be a physical computing machine or virtual computing machine, and may have a characteristic or characteristics identifying the computing machine as one of either of a physical machine or virtual machine.

The physical machine 302 includes a central control system 304. The central control system 304, in one embodiment, can include any combination of the following: cache memory; a main memory unit; a central processing unit; and an operating system. In other embodiments, the central control system 304 includes both software and hardware components necessary to control the operation of the physical machine 302.

A local physical disk 312 can be, in some embodiments, included in the physical machine 302 and is in communication with the central control system 304. The local physical disk 312 can be a hard disk drive or other non-volatile storage device, a portion of a non-volatile storage device, a virtual storage repository, or any other storage repository having operating system components installed therein. In further embodiments, the local physical disk 312 may be a combination of physical or virtual disks in a Redundant Array of Independent Disks (RAID). In one embodiment, the local physical disk 312 is in direct communication with any one of the following machine components: an installer program 314, a paravirtual network interface card (NIC) miniport 306, a physical network interface card (NIC) miniport 308 and a network driver interface specification (NDIS) wrapper 310. In another embodiment, the local physical disk 312 communicates with the following machine components via either the central control system 304 or another machine component: an installer program 314, a paravirtual network interface card (NIC) miniport 306, a physical network interface card (NIC) miniport 308 and a network driver interface specification (NDIS) wrapper 310. In some embodiments, the local physical disk 312 may not be resident on the physical machine 302. In such embodiments, the local physical disk 312 may be located on a second physical machine (not illustrated). The physical machine 302 may be in communication with this second physical machine over a network, such as a Local Area Network (LAN), a Medium Area Network (MAN), a Wide Area Network (WAN) such as the Internet, or any other network described herein.

In one embodiment, the physical machine 302 includes a boot manager 313 in communication with the central control system 304. The boot manager 313 may, in many embodiments, execute commands to instruct the physical machine 302 to boot from a virtual disk not resident on the physical machine 302. In such embodiments, the boot manager 313 may contain pre-boot execution (PXE) code, functions, instructions, or other executable routines to allow operating system bootstrapping. In many embodiments, the boot manager 313 may include software commands to determine the characteristic or characteristics of the physical machine 302, second machine, or any other machine that it is executing upon, to identify the computing machine as a physical machine or virtual machine. In such embodiments, the boot manager 313 may include instructions to select a physical or virtual network interface card in response to the identification of the associated characteristic. These instructions may comprise selecting a physical NIC if the machine is a physical computing machine, and a paravirtual NIC if the machine is a virtual computing machine. In some embodiments, the boot manager 313 may select a NIC from a list, database, pre-coded set, available buses or communicative links, by selecting a NIC identified as physical responsive to the determination that the physical machine 302 is a physical machine or by selecting a NIC identified as paravirtual responsive to the determination that the physical machine 302 is a virtual machine. In other embodiments, the boot manager 313 may have instructions providing the ability to discover available physical and paravirtual NICs resident on the physical machine 302. In still other embodiments, the boot manager 313 may select a NIC in response to instructions from another hardware or software component. The boot manager 313 may contain instructions allowing the physical machine 302 to load a driver associated with the selected physical or paravirtual NIC into memory within the central control system 304 or associated with the boot manager 313. The driver may be a set of instructions, routines, protocols, libraries, or services for enabling a connection to be made between the physical machine 302 and a virtual disk via the selected physical or paravirtual NIC by translating inputs and outputs from the NIC into a format that the central control system 304 and boot manager 313 can read and interact with. In some embodiments, the driver may be stored on a storage device resident on the physical machine 302, while in other embodiments, the driver may be on the virtual disk, a storage device resident on another machine, or in a memory associated with the network interface card. In still other embodiments, the driver may be included in the instructions, libraries, or protocols of the boot manager 313. The boot manager 313 establishes a connection to the virtual disk using the loaded driver. The connection established may, in some instances, be a connection such as Trivial File Transfer Protocol (TFTP), Simple File Transfer Protocol (SFTP), PXE protocol, Bootstrap Protocol, or any similar unicast communications protocol, or may be a multicast or broadcast connection, such as Multicast Trivial File Transfer Protocol (MTFTP), Protocol-Independent Multicast (PIM), or any similar protocol. In some embodiments, the virtual disk contains an operating system. In such embodiments, the boot manager 313 boots the physical machine 302 from the operating system on the virtual disk by transferring via the one of the connections described above sufficient parts of the operating system into memory local to the physical machine 302 to allow the operating system to take over booting from the boot manager 313.

In one embodiment, the physical machine 302 includes an installer program 314 in communication with the central control system 304. The installer program 314 can, in some embodiments, include software commands able to instruct the physical machine 302 to bind to the paravirtual NIC miniport 306 and the physical NIC miniport 308. Other embodiments may include an application, routine, function, logic, virtual object, or other set of code instructions having substantially equivalent functionality to that of the installer program 314 and able to instruct the physical machine 302 to bind to a network interface card. In one embodiment, the installer program 314 can communicate with other machine components via a direct connection, such as the central control system 304, or other physical machine hardware or software components. The installer program 314 in some embodiments is configured to review, analyze or otherwise parse hardware identifiers, storage repositories resident on the physical machine 302, databases resident on the physical machine 302 or other such storage locations for values associated with network interface cards in communication with or on the physical machine 302. In particular, the installer program 314 can be configured to identify values associated with physical and paravirtual network interface cards where the values are device identifiers, drivers, memory locations or other identifying marks or values that represent a network interface card. In some embodiments, the values associated with physical and paravirtual network interface cards may be different values or they may be the same. Some embodiments include a network installer program 314 that binds network interface cards to the physical machine 302 using the values associated with the network interface cards. In one instance, this can be accomplished by associating a value representative of a network interface card with a system file or object used by the machine to boot. In another instance, binding can be accomplished by creating a set of binding information that represents a communicative link established between the computing machine 302 and the paravirtual network interface card miniport 306. In yet another instance, binding can be accomplished by creating a set of binding information that represents a communicative link established between the computing machine 302 and the physical network interface card miniport 308. The binding information may be a set of policies, instructions, libraries, or similar forms of data, associating a network connection point, such as a physical NIC, with a network protocol, such as UDP. In many embodiments, the installer program 314 creates a first set of binding information representative of the communicative link between the computing machine 302 and the paravirtual NIC miniport 306 and a second set of binding information representative of the communicative link between the computing machine 302 and the physical NIC miniport 308. In one embodiment, the installer program 314 further determines whether the paravirtual network interface card is inactive by looking for data identifiers or flags identifying the paravirtual NIC as inactive or other data identifiers or flags identifying the paravirtual NIC as active. In another embodiment, the installer program 314 determines whether the paravirtual NIC is inactive by parsing or analyzing already-existing binding information for policies, instructions, libraries, or similar forms of data associating a network protocol with the paravirtual NIC. In a further embodiment, the installer program 314 creates binding information representative of the communicative link between the computing machine 302 and the paravirtual NIC miniport 306 responsive to a determination that the paravirtual NIC is inactive. In some embodiments, the installer program may be further configured to create a virtual disk that includes the first set of binding information representative of the communicative link between the computing machine 302 and the paravirtual NIC miniport 306 and the second set of binding information representative of the communicative link between the computing machine 302 and the physical NIC miniport 308. In further embodiments, this virtual disk may be stored on a local physical disk 312 in the physical machine 302 or on a remote computing machine (not illustrated).

In communication with the central control system 304 and the NDIS wrapper 310 is a paravirtual NIC miniport 306. In one embodiment the paravirtual NIC miniport 306 can be referred to as any one of the following: paravirtual NIC miniport; paravirtual NIC miniport driver; paravirtual NIC driver; paravirtual NIC port driver; or paravirtual NIC. In one embodiment, the paravirtual NIC miniport 306 is a driver that provides support for a specific network interface card present in a virtual machine by translating inputs and outputs from the paravirtual NIC into a format that the central control system 304 and boot manager 313 can read and interact with, and may enable a computing machine such as physical machine 302 to communicate over a network with a second computing machine (not illustrated.) The paravirtual NIC miniport 306 driver can, in some embodiments, communicate with a class driver to obtain at least a part of the functionality provided by the paravirtual NIC miniport 306. Some embodiments include a paravirtual NIC miniport 306 that communicates with a NDIS wrapper 310 which provides the paravirtual NIC miniport 306 with support routines, and which further creates the binding information that results when the physical machine 302 binds to the paravirtual NIC miniport 306. In one embodiment, the physical machine 302 may contain, in lieu of the paravirtual NIC miniport 306, an application, function, routine, logic, virtual object, or other set of code instructions having substantially equivalent functionality to that of the paravirtual NIC miniport 306.

Embodiments include a physical NIC miniport 308 included in the physical machine 302 and in communication with the central control system 304 and the NDIS wrapper 310. In one embodiment the physical NIC miniport 308 can be referred to as any one of the following: physical NIC miniport; physical NIC miniport driver; physical NIC driver; physical NIC port driver; or physical NIC. In one embodiment, the physical NIC miniport 308 is a driver that provides support for a specific network interface card present in a physical machine by translating inputs and outputs from the physical NIC into a format that the central control system 304 and boot manager 313 can read and interact with, and may enable a computing machine such as physical machine 302 to communicate over a network with a second computing machine (not illustrated). The physical NIC miniport 308 driver can, in some embodiments, communicate with the hardware to obtain at least a part of the functionality provided by the physical NIC miniport 308. Some embodiments include a physical NIC miniport 308 that communicates with a NDIS wrapper 310 which provides the physical NIC miniport 308 with support routines, and which further creates the binding information that results when the physical machine 302 binds to the physical NIC miniport 308. In one embodiment, the physical machine 302 may contain, in lieu of the physical NIC miniport 308, an application, function, routine, logic, virtual object, or other set of code instructions having substantially equivalent functionality to that of the physical NIC miniport 308.

In one embodiment, a NDIS wrapper 310 is included in the physical machine 302. The NDIS wrapper 310, in some embodiments, is a set of export libraries that provide both an abstraction layer and portability for all interactions between a NIC or NIC miniport driver 308, 306 and the operating system included within the central control system 304. When the installer program 314 or another program instructs the physical machine 302 to bind to each of the physical and paravirtual NIC miniport 308, 306, the NDIS wrapper 310 may generate the resultant binding information which can be stored within the operating system, and included within the created virtual disk. In one embodiment, the physical machine 302 may contain, in lieu of the NDIS wrapper 310, an application, function, routine, logic, virtual object, or other set of code instructions having substantially equivalent functionality to that of the NDIS wrapper 310.

Figure 3:
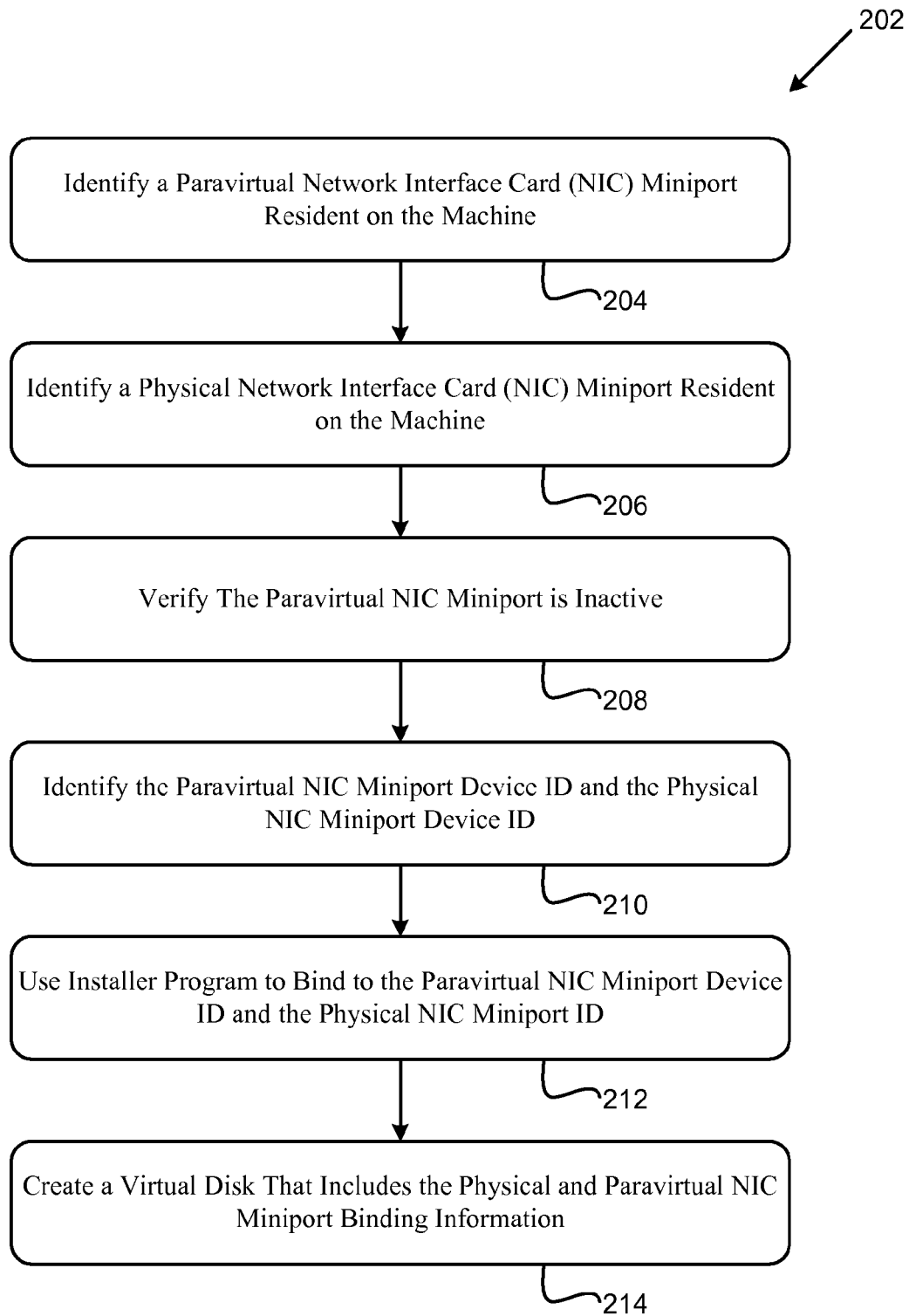
FIG. 3 is a flow diagram illustrative of an embodiment of a method for creating a virtual disk.

Illustrated in FIG. 3 is an embodiment of a method 202 for creating a virtual disk. Creation of the virtual disk can include an identification of a paravirtual NIC miniport that resides on a physical machine (step 204). An identification of a physical NIC miniport that resides on a physical machine (step 206) can also be made. Creation can include the paravirtual NIC miniport even when the paravirtual NIC miniport is inactive (step 208). The device ID for the paravirtual NIC miniport and the device ID for the physical NIC miniport can then be identified (step 210). An installer program binds to the paravirtual NIC miniport device ID and the physical NIC miniport device ID (step 212). A virtual disk is created that includes both the physical NIC miniport binding information and the paravirtual NIC miniport binding information (step 214).

Further referring to FIG. 3, and in more detail, in one embodiment the method 202 can include a step of identifying a paravirtual NIC miniport that is resident on a physical machine (step 204) by identifying a first value associated with the paravirtual NIC. The step may alternately comprise identifying a paravirtual NIC, a paravirtual NIC driver, a paravirtual NIC miniport driver, or any of the other alternate expressions of a paravirtual NIC miniport identified above. The first value associated with the paravirtual NIC may be a Media Access Control address (MAC address), an Ethernet Hardware Address (EHA), a hardware address, an adapter address, or any other value that may be associated with the paravirtual NIC, and may be a fixed value or a variable value. In one embodiment, the paravirtual NIC may first be installed on a physical machine. The paravirtual NIC miniport, in this embodiment, may contain an installation flag that indicates that internal communication between the virtual machine monitor is unavailable when the paravirtual NIC miniport executes outside of the virtual machine monitor. In one embodiment, installation of the paravirtual NIC miniport on the physical machine exposes the paravirtual NIC miniport to the physical machine because there is no virtual machine layer on the physical machine and so the paravirtual NIC miniport is inactive and exposed to the physical machine. Other embodiments may include a method 202 that does not identify a paravirtual NIC miniport (step 204). Still other embodiments may include a method 202 that identifies the first value of the paravirtual NIC miniport when the paravirtual NIC miniport is identified (step 204).

In one embodiment, the method 202 includes a step of identifying the physical NIC miniport (step 206) by identifying a first value associated with the physical NIC. The step may alternately comprise identifying a physical NIC, a physical NIC driver, a physical NIC miniport driver, or any of the other alternate expressions of a physical NIC miniport identified above. The second value may be a Media Access Control address (MAC address), an Ethernet Hardware Address (EHA), a hardware address, an adapter address, or any other value that may be associated with the physical NIC, and may be a fixed value or a variable value. In some embodiments, the second value, associated with the physical NIC, may be a different value or different type of value from the first value, associated with the paravirtual NIC, determined in step 204. In other embodiments, these two values may be the same value or similar values or of the same or similar types. The physical NIC miniport, in one embodiment, is installed on the same physical machine as the paravirtual NIC miniport and is available for use by the physical machine. Other embodiments include a method 202 where the physical NIC miniport is not identified (step 206). Still other embodiments include a method 202 where the device ID of the physical NIC miniport is identified when the physical NIC miniport is identified (step 206).

A verification may be made, in some embodiments, as to whether the paravirtual NIC miniport is inactive (step 208) by analyzing or parsing data identifiers or flags identifying the paravirtual NIC as active or inactive. An inactive paravirtual NIC miniport is, in some embodiments, the result of the installation of the paravirtual NIC miniport on the physical machine. The absence of the virtual machine layer on the physical machine results in a termination of communication between the paravirtual NIC miniport and the virtual machine monitor. This termination of communication causes the paravirtual NIC miniport to become inactive and further exposes the paravirtual NIC miniport to the physical machine. In some embodiments, when the paravirtual NIC miniport is installed on the physical machine, an installation flag may be included with the paravirtual NIC miniport indicating that internal communication with the virtual machine monitor is unavailable. Embodiments may include a verification routine (step 208) with a step dedicated to searching for an installation flag associated with the paravirtual NIC miniport and further verifying that the found installation flag indicates that internal communication with the virtual machine monitor is unavailable. In other embodiments, the installation flag may, either in lieu of or in addition to an indication as to the status of communication between the paravirtual NIC miniport and the virtual machine monitor, indicate whether the paravirtual NIC miniport is inactive. In another embodiment, the verification can be made by parsing or analyzing already-existing binding information for policies, instructions, libraries, or similar forms of data associating a network protocol with the paravirtual NIC and verifying the paravirtual NIC as inactive if no binding information exists. Still other embodiments may not include a verification of the inactivity of the paravirtual NIC miniport (step 208).

In one embodiment, the paravirtual NIC miniport device ID and the physical NIC miniport device ID are identified (step 210). The device ID, in some embodiments, is an identifier that is unique to a particular device and may also be referred to as an associated first value or an associated second value (for a second device). The device ID may be any value that can be associated with the device, including a MAC address, EHA, physical address, hardware address, memory register value, or any other fixed or variable value. In one embodiment, the paravirtual NIC miniport device ID is a unique first value that corresponds to the paravirtual NIC, and the physical NIC miniport device ID is a unique second value that corresponds to the physical NIC. In some embodiments, the paravirtual NIC miniport device ID corresponds substantially exclusively to the paravirtual NIC, and the physical NIC miniport device ID corresponds substantially exclusively to the physical NIC. In other embodiments, the paravirtual NIC and physical NIC device IDs may be identical, similar, or different but not unique from other device IDs within the system. Embodiments may include a method 202 where identification of each the paravirtual and physical NIC miniport associated values (step 210) occurs when the paravirtual NIC miniport is identified (step 204), and when the physical NIC miniport is identified (step 206). Still other embodiments may include a method 202 where identification of each of the paravirtual and physical NIC miniport device ID (step 210) occurs when the installer program binds to each device ID (step 212).

Still referring to FIG. 3, the method 202 includes, in some embodiments, a step of using an installer program to bind a computing machine to the paravirtual NIC and physical NIC resident on the computing machine (step 212), by creating binding information associating the paravirtual and physical NIC with a communications service or communications services. In one embodiment, the binding information, established when the installer program binds services to each of the paravirtual NIC and the physical NIC (step 212), is created by the network driver interface specification (NDIS) wrapper component. The NDIS wrapper component, in one embodiment, provides binding information that, subsequent to binding, resides in the physical machine. Other embodiments may include an application, routine, virtual object, or other set of code instructions including a subroutine of the installer program, having substantially equivalent functionality to that of the NDIS wrapper component and able to create binding information in response to the binding of the physical machine to each of the paravirtual NIC miniport and the physical NIC miniport. Still other embodiments may include an application, routine, virtual object, or other set of code instructions having substantially equivalent functionality to that of the installer program, and able to bind the physical machine to each of the paravirtual NIC and the physical NIC. In one other embodiment, binding the physical machine to each of the paravirtual NIC miniport device ID, and the physical NIC miniport device ID via the installer program (step 212) further includes identifying the first value associated with the paravirtual NIC, and the second value associated with the physical NIC (step 210).

In one embodiment, the method 202 can be used to create a virtual disk that includes both the physical and paravirtual NIC miniport binding information (step 214). Embodiments may include a method 202 that scans the physical machine for binding information and includes all available binding information in the created virtual disk. The binding information included within the virtual disk is used by the virtual disk as a record that indicates which network an operating system should boot from. In other embodiments, the virtual disk may be a disk image. In many embodiments, the virtual disk may be created on a second physical machine or server over a network. In such embodiments, the network may be a wired or wireless network, a direct connection between the two computers, or a LAN, MAN, or WAN network including the Internet, or any other network described herein. In other embodiments, the virtual disk may be created on a storage device connected to or included within the physical machine. The virtual disk may be created as a single-client image, or may have the capability to be accessed by multiple clients simultaneously.

Figure 4:
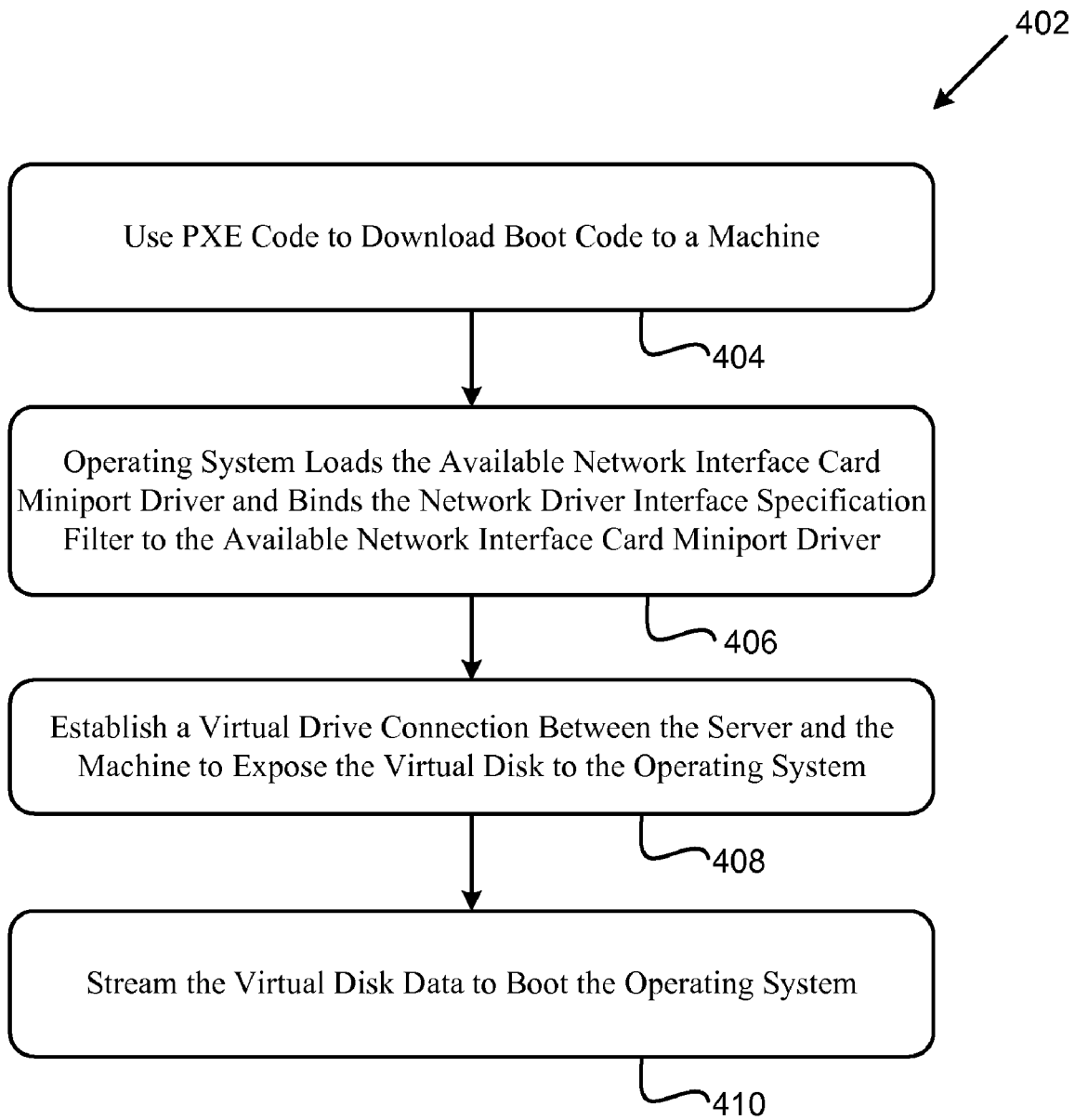
FIG. 4 is a flow diagram illustrative of an embodiment of a method for booting from a virtual disk.

Illustrated in FIG. 4 is a flow diagram that illustrates method 402 which describes a process or method for booting from a virtual disk. Within the method 402, pre-boot execution (PXE) code is used to download operating system boot code to a particular machine or computing machine (step 404). The operating system is then loads and initializes an available network interface card (NIC) miniport driver, and binds the network driver interface specification (NDIS) filter to the available NIC miniport driver (step 406). A virtual drive connection is then established between the server and the machine to expose the virtual disk to the operating system (step 408). Virtual disk data is then streamed to the machine to boot the operating system (step 410).

Further referring to FIG. 4, and in more detail, the described method 402 illustrates a process or method by which either a physical computing machine or a virtual computing machine boots from a single virtual disk. This method or process can in some embodiments also be referred to as provisioning a single virtual disk to either a physical computing machine or a virtual computing machine.

In one embodiment pre-boot execution (PXE) code is used to download boot code to a machine (step 404). The PXE code may be any code, logic, function, or instructions that provide equivalent pre-boot execution ability. Further, some embodiments include using PXE code or equivalent code to download or stream boot code onto any one of: a machine; a virtual machine; a computing machine; a physical machine; an appliance; or any other computing structure having a processor and memory and able to receive downloaded boot code. In some embodiments, the machine can be a machine that resides on the same network as the virtual disk such that the virtual drive connection is established via the network. Still other embodiments include the virtual drive connection being established over a dedicated bus. In some embodiments, downloading of boot code may be over Trivial File Transfer Protocol (TFTP). In other embodiments, downloading of boot code may be over Multicast Trivial File Transfer Protocol (MTFTP). In still other embodiments, downloading of boot code may be over Easy File Transfer Protocol (EFTP), Byte Stream Protocol, or any other protocol for communication between the machine and the virtual disk.

The operating system, in one embodiment, loads the available NIC miniport driver and binds the NDIS filter to the available NIC miniport driver (step 406). In embodiments where the machine attempting to boot is a physical machine, the available NIC miniport driver can be a physical NIC miniport driver. Such embodiments will then include a step of loading, by the operating system, the physical NIC miniport driver. In embodiments where the machine attempting to boot is a virtual machine, the available NIC miniport driver can be a virtual NIC miniport driver. Such embodiments will then include a step of loading, by the operating system, the virtual NIC miniport driver. The NDIS filter, in some embodiments, operates to multiplex network packets amongst multiple paths or channels of either constant or varying bandwidth within a network bandwidth. In one embodiment, the NDIS filter binds to the available NIC miniport driver to intercept data exchanged between the network and the operating system and to further pass data to a virtual storage driver stack to expose a hard disk within the machine to the operating system so that the operating system may perform a diskless boot. In embodiments where the machine is a physical machine, the NDIS filter will bind to the physical NIC miniport driver. In embodiments where the machine is a virtual machine, the NDIS filter will bind to the paravirtual NIC miniport driver.

In one embodiment, the method 402 includes establishing a virtual drive connection between the server and the machine to expose the virtual disk to the operating system (step 408).

In some embodiments, the virtual drive connection allows the server to transparently emulate operation of a disk local to the machine.

Data within the virtual disk, in one embodiment, is streamed to the machine to boot the operating system (step 410). In such an embodiment, the machine can be either of a physical machine or a virtual machine, and the available NIC miniport driver on the machine can be used to facilitate streaming of the virtual disk data. In one embodiment, the virtual disk may be used to boot many physical machines on a network. In such an embodiment, a system administrator may boot the same virtual disk in a virtual machine for the purposes of maintaining the virtual disk. In another embodiment, the virtual disk may be used to boot networked diskless machines for use in grid computing or a distributed supercomputer.

Figure 5:
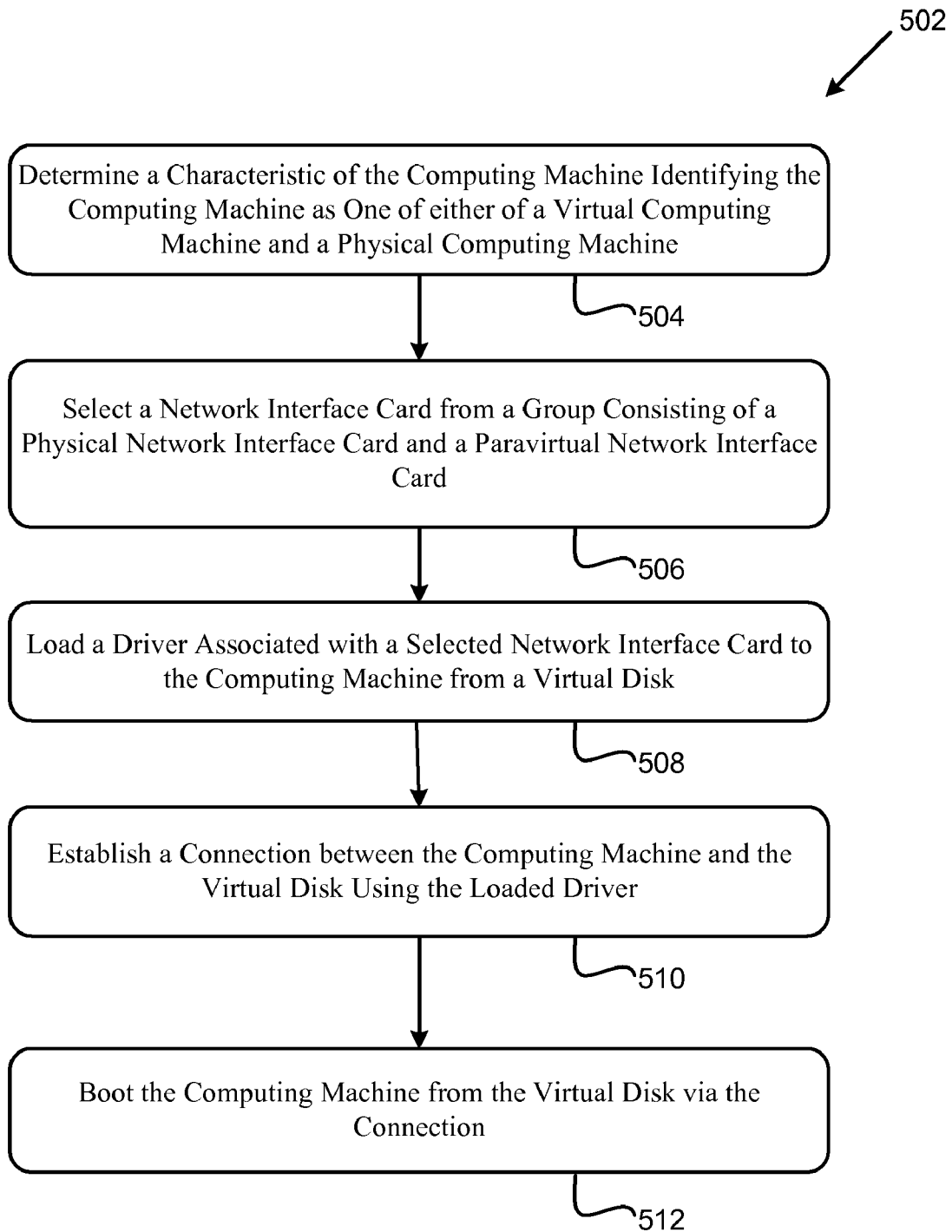
FIG. 5 is a flow diagram illustrative of a further embodiment of a method for booting from a virtual disk.

Illustrated in FIG. 5 is an embodiment of a method 502 for booting a computing machine from a virtual disk. Booting the computing machine may include a determination of a characteristic of the computing machine identifying it as either a virtual computing machine or a physical computing machine (step 504). A physical network interface card or a paravirtual network interface card may be selected (step 506). A driver associated with the selected network interface card may be loaded to the computing machine from a virtual disk (step 508). Booting the computing machine may include establishing a connection between the computing machine and the virtual disk using the loaded driver (step 510). The computing machine is booted from the virtual disk via the established connection (step 512).

Further referring to FIG. 5, and in more detail, in one embodiment the method 502 may include a step of determining a characteristic or characteristics of a computing machine, the characteristic or characteristics identifying the machine as a physical machine or a virtual machine. The characteristic may be a hardware identifier, a data string, a particular bit within a ROM or emulated ROM, or any other element that may have a value for a virtual machine different from a value for a physical machine. In some embodiments, the characteristic or characteristics may be determined by scanning hardware identifiers or data identifying the computing environment.

In one embodiment, the method 502 includes a step of selecting a network interface card from a group consisting of a physical network interface card and a paravirtual network interface card (step 506). In some embodiments, the selection of a physical NIC is made responsive to the determination of a characteristic identifying the computing machine as a physical machine. In other embodiments, the selection of a paravirtual NIC is made responsive to the determination of a characteristic identifying the computing machine as a virtual machine.

In one embodiment, the method 502 includes a step of loading a driver associated with the selected network card to the computing machine from a virtual disk (step 508). The driver may be a set of instructions, routines, protocols, libraries, or services for enabling a connection to be made between the computing machine and the virtual disk via the selected physical or paravirtual NIC by translating inputs and outputs from the NIC into a format that the computing machine can read and interact with. While in many embodiments, the driver may be stored on the virtual disk, in other embodiments, the driver may be stored on a disk resident on the computing machine, or on another storage device accessible to the computing machine either directly or via a network. In some embodiments, the virtual disk may be stored on a second computing machine. In some instances of these embodiments, the second computing machine may reside on the same network as the computing machine, while in others, the second computing machine may reside on a different network than the computing machine. In such instances, the computing machine and the second computing machine may communicate over multiple networks and bridged networks, such as the Internet, or any other network described herein.

In one embodiment, the method 502 includes a step of establishing a connection between the computing machine and the virtual disk using the loaded driver (step 510). The connection established may, in some instances, be a connection such as Trivial File Transfer Protocol (TFTP), Simple File Transfer Protocol (SFTP), PXE protocol, Bootstrap Protocol, or any similar unicast communications protocol, or may be a multicast or broadcast connection, such as Multicast Trivial File Transfer Protocol (MTFTP), Protocol-Independent Multicast (PIM), or may be any other protocol that allows a computing machine to boot by streaming or downloading boot sectors or other data used by a boot loader to boot a computing machine. In some embodiments, the connection allows the computing machine to transparently interact with the virtual disk as if it were a physical disk resident on the computing machine.

In one embodiment, method 502 includes a step of booting the computing machine from the virtual disk via the connection (step 512). In such embodiments, the virtual disk may contain an operating system or instructions to allow the computing machine to boot. The connection is used to download or stream boot sectors from the virtual disk, by transferring sufficient parts of the operating system from the virtual disk into the memory of the computing machine to allow the operating system to take over and complete booting.

The present invention may be provided as one or more computer-readable programs embodied on or in one or more articles of manufacture. The article of manufacture may be a floppy disk, a hard disk, a compact disc, a digital versatile disc, a flash memory card, a PROM, a RAM, a ROM, a computer readable medium having instructions executable by a processor, or a magnetic tape. In general, the computer-readable programs may be implemented in any programming language. Some examples of languages that can be used include C, C++, C#, or JAVA. The software programs may be stored on or in one or more articles of manufacture as object code.

While various embodiments of the methods and systems have been described, these embodiments are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompany claims and their equivalents.

What is claimed is:

1. A method for booting a computing machine from a virtual disk, the method comprising:
   determining, by a processor associated with the computing machine, a characteristic of the computing machine, the characteristic identifying the computing machine as one of either of a virtual computing machine and a physical computing machine;
   selecting a physical network interface card when the computing machine is determined to be a physical computing machine;

selecting a paravirtual network interface card when the computing machine is determined to be a virtual computing machine;
loading a driver associated with the selected network interface card to the computing machine from the virtual disk;
establishing a connection between the computing machine and the virtual disk using the loaded driver; and
booting the computing machine from the virtual disk via the connection.

2. The method of claim 1, wherein loading a driver further comprises loading a driver to the computing machine from a virtual disk that is stored on a second computing machine.

3. The method of claim 2, wherein the computing machine and the second computing machine reside on the same network.

4. The method of claim 1, wherein the identified characteristic of the computing machine is one of a hardware identifier, a data string, a bit within a read-only memory.

5. The method of claim 1, wherein identifying a characteristic of the computing machine further comprises at least one of scanning hardware identifiers of the computing machine and scanning data identifying a computing environment of the computing machine.

6. The method of claim 1, wherein loading the driver further comprises loading a set of instructions, routines, protocols, libraries, or services for enabling a connection to be made between the computing machine and the virtual disk.

7. The method of claim 1, wherein establishing a connection further comprises establishing one of a Trivial File Transfer Protocol (TFTP), a Simple File Transfer Protocol (SFTP), a PXE protocol, and a Bootstrap Protocol connection.

8. The method of claim 1, wherein booting the computing machine from the virtual disk further comprises downloading boot sectors from the virtual disk.

9. The method of claim 1, wherein booting the computing machine from the virtual disk further comprises streaming boot sectors from the virtual disk.

10. A system having a processor for booting a computing machine from a virtual disk, the system comprising:
a boot manager executing on the computing machine having an associated characteristic, the characteristic identifying the computing machine as one of either of a virtual computing machine and a physical computing machine, the boot manager executing to:
determine the associated characteristic;
select a physical network interface card when the computing machine is determined to be a physical computing machine;
select a paravirtual network interface card when the computing machine is determined to be a virtual computing machine;
load a driver associated with the selected network interface card to the computing machine from the virtual disk;
establish a connection between the computing machine and the virtual disk using the loaded driver; and
boot the computing machine from the virtual disk via the connection.

11. The system of claim 10, wherein the characteristic of the computing machine is one of a hardware identifier, a data string, a bit within a read-only memory.

12. The system of claim 10, wherein the boot manager further executes to determine the associated characteristic of the computing machine by scanning hardware identifiers of the computing machine or by scanning data identifying a computing environment of the computing machine.

13. The system of claim 10, wherein the boot manager further executes to load the driver by loading a set of instructions, routines, protocols, libraries, or services for enabling a connection to be made between the computing machine and the virtual disk.

14. The system of claim 10, wherein the boot manager further executes to establish a connection by establishing one of a Trivial File Transfer Protocol (TFTP), a Simple File Transfer Protocol (SFTP), a PXE protocol, and a Bootstrap Protocol connection.

15. The system of claim 10, wherein the boot manager further executes to boot the computing machine from the virtual disk by downloading boot sectors from the virtual disk.

16. The system of claim 10, wherein the boot manager further executes to boot the computing machine from the virtual disk by streaming boot sectors from the virtual disk.

17. The system of claim 10, wherein the boot manager further executes to load a driver by loading a driver to the computing machine from a virtual disk that is stored on a second computing machine.

18. The system of claim 17, wherein the computing machine and the second computing machine reside on the same network.

* * * * *